(12) United States Patent
Shaw et al.

(10) Patent No.: US 10,501,970 B2
(45) Date of Patent: Dec. 10, 2019

(54) MOTOR VEHICLE AND A DOOR HINGE MECHANISM THEREFOR

(71) Applicant: Ford Global Technologies, LLC, Dearborn, MI (US)

(72) Inventors: Vince Leslie Shaw, Copford (GB); Torsten Gerhardt, London (GB); Robert Spahl, Cologne (DE); David Burrage, Horsham (GB)

(73) Assignee: Ford Global Technologies, LLC, Dearborn, MI (US)

(\*) Notice: Subject to any disclaimer, the term of this patent is extended or adjusted under 35 U.S.C. 154(b) by 118 days.

(21) Appl. No.: 15/649,933

(22) Filed: Jul. 14, 2017

(65) Prior Publication Data

US 2018/0030764 A1    Feb. 1, 2018

(30) Foreign Application Priority Data

Jul. 27, 2016    (GB) .................................. 1612998.3

(51) Int. Cl.
*E05D 3/12* (2006.01)
*E05D 3/10* (2006.01)
(Continued)

(52) U.S. Cl.
CPC ............ *E05D 3/127* (2013.01); *B60J 5/0472* (2013.01); *E05D 3/04* (2013.01); *E05D 3/08* (2013.01); *E05D 3/10* (2013.01); *E05D 11/1057* (2013.01); *E05D 15/52* (2013.01); *E05F 15/40* (2015.01); *E05F 15/42* (2015.01); *E05F 15/611* (2015.01);
(Continued)

(58) Field of Classification Search
CPC ........... E05D 3/10; E05D 11/06; E05D 15/00; E05D 15/56; E05D 5/062; E05F 15/611; E05F 15/43; E05F 15/603; E05F 15/73; E05F 2015/432; E05F 2015/434; E05F 15/60
USPC ...... 296/146.12, 146.11, 202, 147, 149, 154, 296/193.01, 50, 65; 49/246, 248, 192, 49/216, 502, 341, 358, 362, 386, 95;
(Continued)

(56) References Cited

U.S. PATENT DOCUMENTS 6,808,223 B1 \* 10/2004 Baum ................... B60J 5/0472
16/366
7,048,322 B2 \* 5/2006 DeBono ................ B60J 5/0472
16/289
(Continued)

FOREIGN PATENT DOCUMENTS

DE        19537504 A1 \*  4/1997  ........... B60J 5/0416
DE     102004007054 A1     9/2005
WO       2015043555 A1     4/2015

*Primary Examiner* — D Glenn Dayoan
*Assistant Examiner* — Sunsurraye Westbrook
(74) *Attorney, Agent, or Firm* — Vichit Chea; Price Heneveld LLP

(57) ABSTRACT

A motor vehicle is disclosed having a door that is attached to the motor vehicle by a hinge mechanism providing both full swing opening of the door and full scissor opening of the door. The motor vehicle includes an apparatus to assist with the selection of a preferred mode of door opening based upon an assessment of the surroundings in which the motor vehicle 1 rests. The assessment of the surroundings and selection of the preferred mode of door opening is carried out by an electronic controller based upon information received from a sensing apparatus.

18 Claims, 9 Drawing Sheets

(51) Int. Cl.
*E05F 15/611* (2015.01)
*E05D 15/52* (2006.01)
*E05F 15/40* (2015.01)
*E05D 3/04* (2006.01)
*B60J 5/04* (2006.01)
*E05F 15/42* (2015.01)
*E05D 3/08* (2006.01)
*E05D 11/10* (2006.01)

(52) U.S. Cl.
CPC ... *E05F 2015/483* (2015.01); *E05Y 2900/531* (2013.01)

(58) Field of Classification Search
USPC ... 16/366, 367, 368, 371, 294, 369, 82, 223, 16/86 B, 86 C, 86 R
See application file for complete search history.

(56) References Cited

U.S. PATENT DOCUMENTS

| | | | |
|---|---|---|---|
| 7,396,068 B1* | 7/2008 | McRobert | B60J 5/047 |
| | | | 16/368 |
| 7,779,510 B2 | 8/2010 | Hoffman | |
| 9,068,383 B2* | 6/2015 | Wurst | E05D 7/00 |
| 2001/0054257 A1* | 12/2001 | Wygle | E05F 15/619 |
| | | | 49/349 |
| 2004/0187263 A1* | 9/2004 | Hoffman | B60J 5/0472 |
| | | | 16/367 |
| 2005/0204511 A1 | 9/2005 | Wohlfarth | |
| 2007/0245525 A1 | 10/2007 | Hoffman | |
| 2008/0083089 A1 | 4/2008 | Hoffman | |
| 2013/0138303 A1* | 5/2013 | McKee | H02P 29/028 |
| | | | 701/49 |
| 2016/0053524 A1 | 2/2016 | Serban et al. | |
| 2017/0030127 A1* | 2/2017 | Elie | E05F 15/42 |

* cited by examiner

MOTOR VEHICLE AND A DOOR HINGE MECHANISM THEREFOR

FIELD OF THE INVENTION

The present invention generally relates to motor vehicles, and in particular, to a hinge mechanism for attaching a door to a motor vehicle.

BACKGROUND OF THE INVENTION

It is well-known to hingedly attach a door to a body structure of a motor vehicle using one or more hinge mechanisms that facilitate opening of the door about a substantially vertical axis located close to a front or rear end of the door. Such doors are referred to herein as "swing open doors."

It is a known problem with such a swing open door that a considerable amount of space has to be available to the side of the motor vehicle in order to permit the door to be opened sufficiently to permit ingress or egress. For example, if the length of the door is 0.9 m and it is required to swing open the door for egress then at least 60 degrees of door rotation may be required to enable egress via the door. Such a rotation will required a gap of approximately 0.78 m to the side of the motor vehicle to which the door is attached.

In order to overcome such a problem it has been proposed to mount the door so that it rotates about a substantially horizontal transverse axis from a closed position to an open position in which the door extends upwardly. Such doors are normally referred to as a 'scissor opening door' or a 'scissor door' and one example of a hinge mechanism that provides scissor operation is provided in U.S. Pat. No. 7,779,510.

Such a scissor arrangement has the advantage that very little space has to be available to the side of the motor vehicle to permit the door to be opened but has the disadvantage that when the door is opened it will project vertically above the normal roof line of the motor vehicle and so can be problematic if the motor vehicle is to be parked in a parking garage having a low ceiling height.

It is desirable to provide a motor vehicle with an apparatus to assist with the selection of the mode of opening of a door having a hinge mechanism permitting both scissor and pivot opening of a door. It is further desirable to provide a hinge mechanism permitting both scissor and pivot opening of a door.

SUMMARY OF THE INVENTION

According to a first aspect of the invention there is provided a motor vehicle having an apparatus for assisting with the selection of an opening mode of a door of the motor vehicle hingedly connected to a body structure of the motor vehicle by a hinge mechanism providing both swing and scissor opening modes of door opening wherein the apparatus comprises an electronic controller, at least one human machine interface connected to the electronic controller to provide an indication from a user of the motor vehicle that opening of the door is required, a sensing apparatus to provide information to the electronic controller indicative of whether there are any obstructions to the side of the motor vehicle that would interfere with swing opening of the door and whether there are any overhead obstructions that would interfere with scissor opening of the door and, in response to an indication from the user of the motor vehicle that door opening is required, the electronic controller is arranged to use the information provided from the sensing apparatus to select a preferred mode of door opening.

If the information from the sensing apparatus indicates that there is sufficient space for the door to be swung open sufficiently to permit egress from the vehicle then the swing open mode of door opening may be selected by the electronic controller.

The apparatus may further comprise one or more user feedback devices connected to the electronic controller and selecting a preferred mode of door opening may comprise providing feedback to the vehicle user using the one or more feedback devices of the mode of door opening that has been selected by the electronic controller as the preferred mode of door opening.

The hinge mechanism may further include at least two latching mechanisms controlled by the electronic controller and selecting the preferred mode of door opening may include using the electronic controller to operate the latching mechanisms to facilitate the preferred mode of door opening while inhibiting the other mode of door opening.

The hinge mechanism may further include powered swing and scissor door actuation mechanisms controlled by the electronic controller and selecting the preferred mode of door opening may include using the electronic controller to operate at least one of the door actuation mechanisms to produce the preferred mode of door opening.

According to a second aspect of the invention there is provided a hinge mechanism for connecting a motor vehicle door to a body structure of a motor vehicle so as to facilitate a swing open mode of door opening in which the door is rotatable about a first axis between a closed position and a fully swung open position and a scissor open mode of door opening of the door in which the door is rotatable about a second axis arranged substantially perpendicularly to the first axis between the closed position and a scissor open position wherein the hinge mechanism comprises a number of connected hinge members arranged to facilitate said swing and scissor opening. The first axis may be a substantially vertically arranged axis to facilitate the swing open mode of door opening and the second axis may be a substantially horizontally arranged axis to facilitate the scissor open mode of door opening.

The number of connected hinge members may comprise a hinge member for attaching the hinge mechanism to part of the body structure of the motor vehicle, a hinge member for attaching the hinge mechanism to the door of the motor vehicle, a first pair of hinge members rotatably connected together to allow rotation of one of the two hinge members relative to the other of the two hinge members about the first axis so as to facilitate the swing open mode of door opening, a second pair of hinge members rotatably connected together to allow rotation of one of the two hinge members relative to the other of the two hinge members about the second axis so as to facilitate the scissor open mode of door opening.

The hinge mechanism may comprise first, second, third and fourth hinge members, the first hinge member may be the hinge member used to attach the hinge mechanism to part of the body structure of the motor vehicle, the first hinge member and the third hinge member may form the first pair of hinge members, the third and fourth hinge members may form the second pair of hinge members and the fourth hinge member may be the hinge member used to attach the hinge mechanism to the door. The second hinge member may be pivotally connected to the first hinge member for rotation about the first axis and may be selectively latchable to the first hinge member and the fourth hinge member to control the opening mode of the door.

To facilitate the swing open mode of door opening the second hinge member may not be latched to the first hinge member and may be latched to the fourth hinge member so as to hold the second third and fourth hinge members together. To facilitate the scissor open mode of door opening the second hinge member may be latched to the first hinge member and not latched to the fourth hinge member.

The hinge mechanism for at least one of the two modes of door opening may also facilitate limited movement of the door away from the surrounding body structure about an axis of rotation that is different to the axis of rotation used to subsequently open the door.

The hinge mechanism may further comprise a swing rotation stop means to provide a predefined limited rotation of the third hinge member about the first axis when the second hinge member is latched to the first hinge member but not to the fourth hinge member to provide the limited movement of the door away from the surrounding body structure prior to full scissor opening of the door.

The hinge mechanism may further comprise a first latching mechanism to selectively latch the second hinge member to the first hinge member and a second latching mechanism to selectively latch the second hinge member to the fourth hinge member. The first and second latching mechanisms may be electronically controllable latching mechanisms.

The second hinge member may include a scissor rotation stop means to prevent rotation of the fourth hinge member relative to the third hinge member about the second axis before the limited rotation of the third hinge member about the first axis provided by the swing rotation stop means is exhausted.

Alternatively, the hinge mechanism may comprise first, second, third and fourth hinge members wherein the first hinge member may be the hinge member used to attach the hinge mechanism to the body structure, the fourth hinge member may be the hinge member used to attach the hinge mechanism to the door, the third and fourth hinge member may form the first pair of hinge members, the second and third hinge members may form the second pair of hinge members and the second hinge member may be pivotally connected to the first hinge member for limited rotation about a third substantially vertical axis spaced away from the first and second axes. The fourth hinge member may rotate relative to the third hinge member about the first pivot axis to facilitate the swing open mode of door opening and the third hinge member may rotate relative to the second hinge member about the second axis to facilitate the scissor open mode of door opening. The hinge mechanism may include a first latching mechanism to selectively latch the first and third hinge members together and a second latching mechanism to selectively latch the third and fourth hinge members together.

The hinge mechanism for at least one of the two modes of door opening may also facilitate limited movement of the door away from the surrounding body structure about an axis of rotation that is different to the axis of rotation used to subsequently open the door in which case, the hinge mechanism may include a swing rotation stop means to allow a limited rotation of the second hinge member relative to the first hinge member about the third axis when the first latching mechanism is unlatched to provide the limited movement of the door away from the surrounding body structure prior to scissor opening of the door.

To permit swing opening of the door, the second latching mechanism may be unlatched and the first latching mechanism may be latched so as to hold the first and third members together. To permit scissor opening of the door, the first latching mechanism may be unlatched and the second latching mechanism may be latched. The first and second latching mechanisms may be electronically controllable latching mechanisms.

The third hinge member may include a scissor rotation stop means to prevent rotation of the third hinge member relative to the second hinge member about the second axis before the limited rotation of the second hinge member about the third axis provided by the swing rotation stop means is exhausted. The hinge mechanism may include a stop means to prevent sagging of the door during swing opening of the door.

According to a third aspect of the invention there is provided an apparatus for selecting an opening mode of a door connected to a vehicle by a hinge mechanism providing swing and scissor opening modes. The apparatus includes a human machine interface receiving a door opening request, and a sensor sensing side obstructions that would interfere with swing opening of the door and overhead obstructions that would interfere with scissor opening of the door, and a controller selecting a mode of door opening based on the sensed obstructions.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1A:
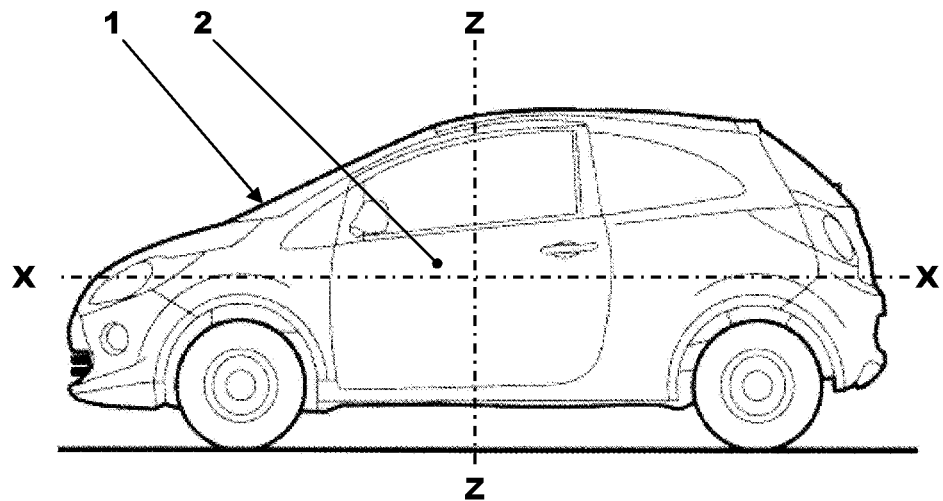
FIG. 1a is a side view of a motor vehicle having a pair of doors showing a left hand side door in a closed position.
Figure 1B:
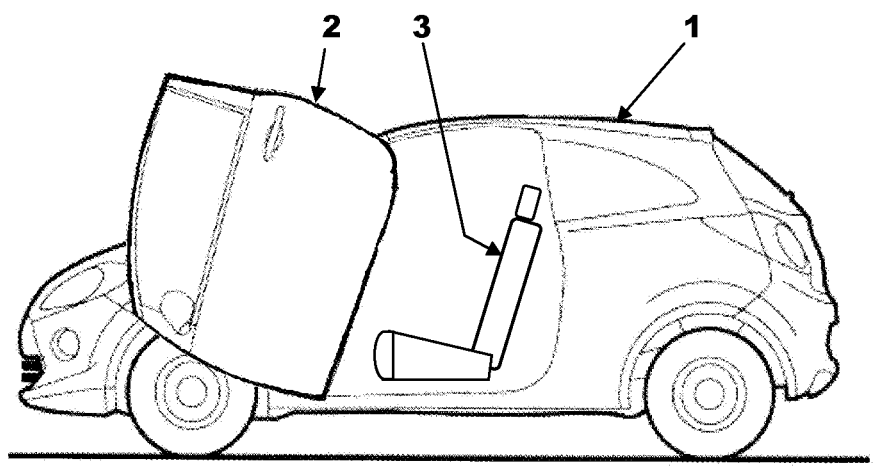
FIG. 1b is a side view similar to FIG. 1a but showing the door in an open position after a scissor opening procedure has been followed.
Figure 2:
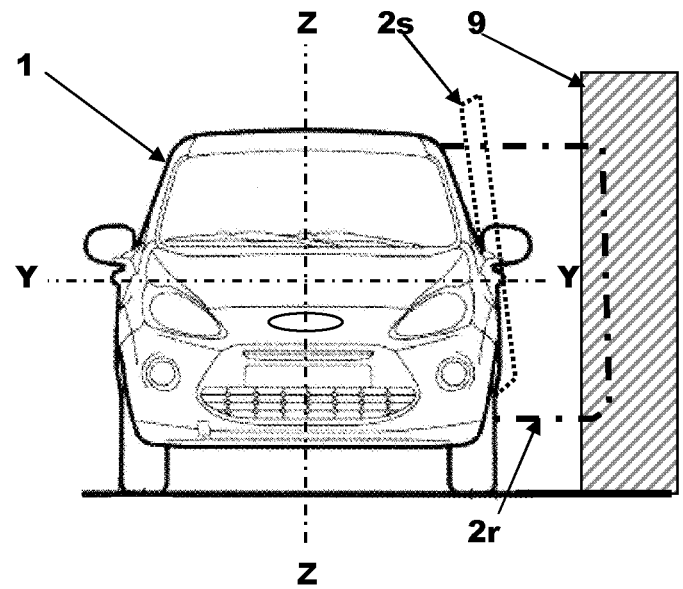
FIG. 2 is a front view of the motor vehicle shown in FIGS. 1a and 1b showing as a dotted outline the position of the left hand side door when in the scissor open position shown in FIG. 1b and as a chain dotted outline the door when in a fully swung open position following a swing opening of the door.

With particular reference to FIGS. 1a, 1b and 2 there is shown a motor vehicle 1 having a pair of doors 2 of which only the left hand side door 2 is visible. A number of seats are mounted in a passenger compartment of the motor vehicle 1 of which a front left hand side seat 3 is shown in FIG. 1b. The motor vehicle 1 has a longitudinal axis X-X, a vertical axis Z-Z and a transverse horizontal axis Y-Y.

As shown in FIG. 2, when the door 2 is opened using a scissor opening procedure or mode of opening it moves to a scissor open position indicated by the dotted outline 2s and, when the door 2 is opened using a swing opening procedure or mode of opening it moves to a fully swung open position indicated by the chain dotted outline 2r. An obstruction 9 is shown next to the motor vehicle 1 in FIG. 2 and is provided as one example of when scissor opening of the door 2 would be beneficial because swing opening of the door 2 is restricted by the presence of the obstruction.

Figure 3:
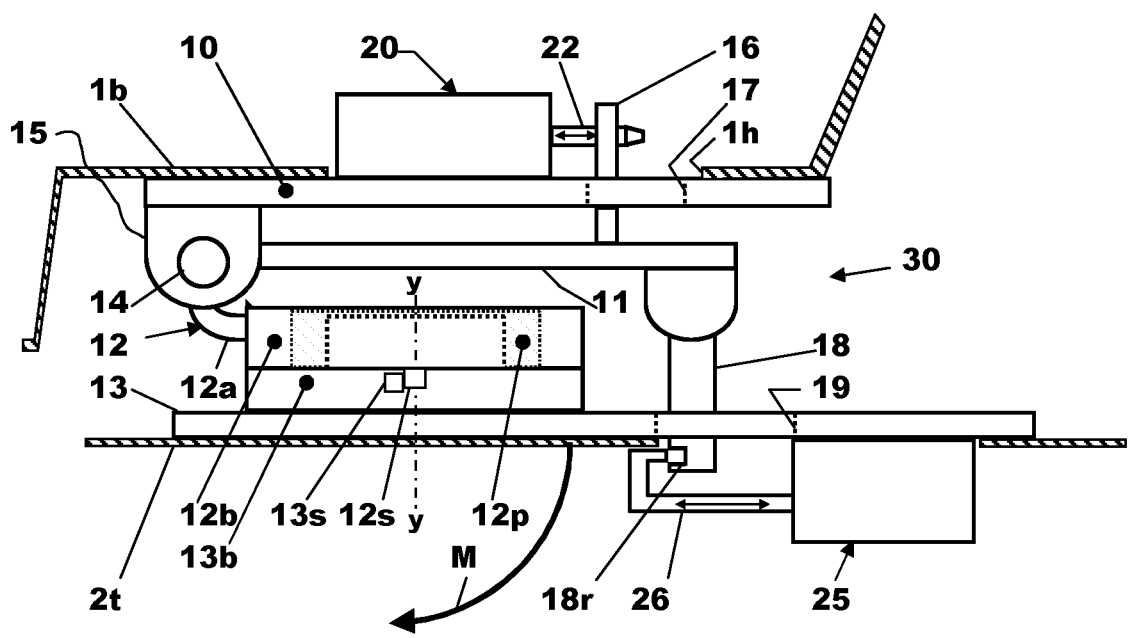
FIG. 3 is a plan view of a first embodiment of a hinge mechanism showing the hinge mechanism in a door closed position.
Figure 4A:
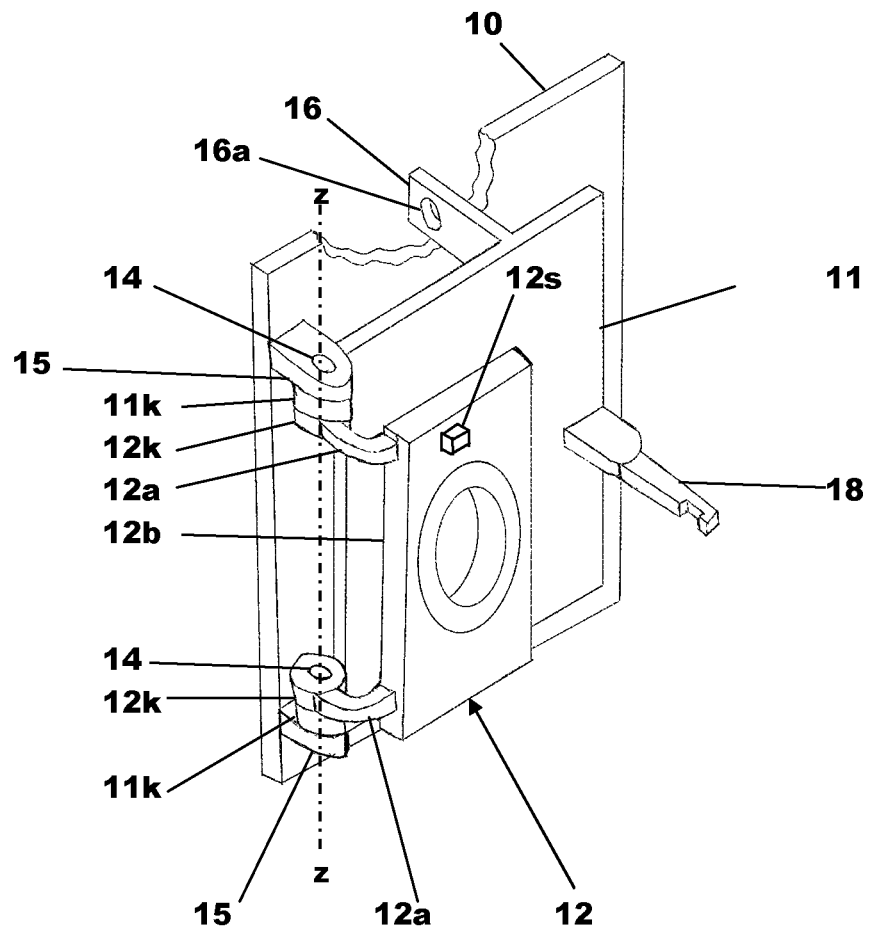
FIG. 4a is a front perspective view of part of the hinge mechanism shown in FIG. 3.
Figure 4B:
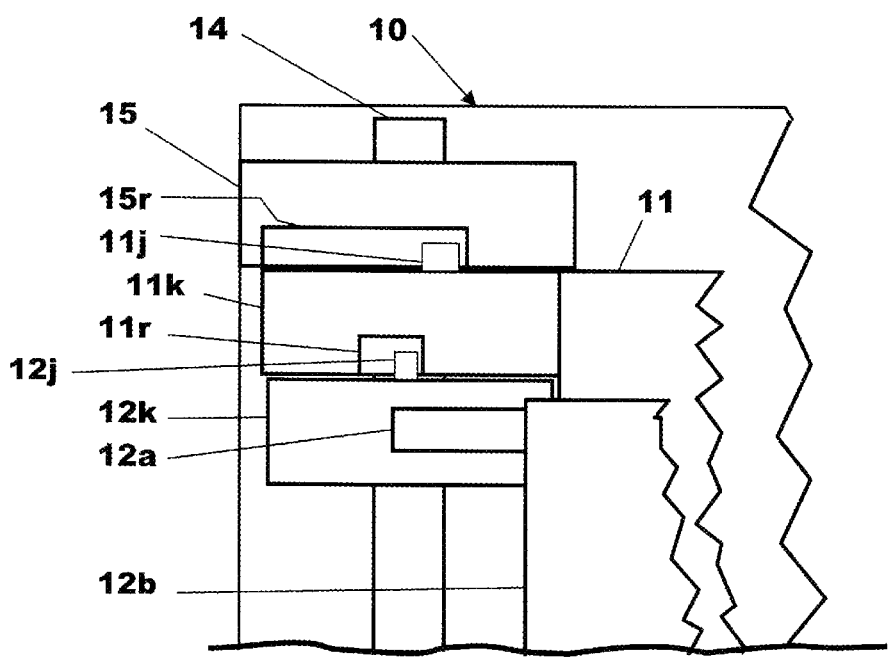
FIG. 4b is an enlarged side view of part of the hinge mechanism shown in FIGS. 3 and 4a showing swing rotation stop means to limit rotation of the door about a vertical axis of rotation.

With reference to FIGS. 3 and 4A and 4B there is shown a first embodiment of a bi-axis hinge mechanism 30 for the door 2. A bi-axis hinge mechanism 30 as meant herein is a hinge mechanism that facilitates both scissor opening and swing opening of a door such as the door 2. The hinge mechanism 30 comprises a first hinge member 10 fastened to part of a body structure 1b of the motor vehicle 1, a second hinge member 11 pivotally connected to the first hinge member 10 for rotation about a substantially vertical pivot axis, a third hinge member 12 pivotally connected to the first hinge member 10 so as to be rotatable about the same vertical pivot axis as the second hinge member 11 and a fourth hinge member 13 fastened to a structural part 2t of the door 2 and rotationally connected to the third hinge member for rotation about a substantially horizontal axis y-y that is in this case arranged parallel to the transverse axis Y-Y of the motor vehicle 1 when the door 2 is in a closed position.

A substantially vertical pivot axis z-z for the second and third hinge members 11 and 12 is defined by a pair of spaced apart hinge pins 14 each of which is supported by a lug 15 extending outwardly from the first hinge member 10. The substantially vertical pivot axis z-z of the hinge mechanism 30 is arranged in the case of this example substantially parallel to the vertical axis Z-Z of the motor vehicle 1 at least when the door 2 is in a closed position.

The second hinge member 11 has a pair of spaced apart bosses 11k each defining an aperture (not shown) through which a respective hinge pin 14 extends. As shown in FIG. 4b, which shows on an enlarged scale the arrangement of the upper rotational connections between the first, second and third hinge members 10, 11 and 12 and the upper hinge pin 14, the boss 11k includes an upstanding projection 11j that is engaged in a recess 15r formed in the lug 15. The engagement of the projection 11j with the recess 15r limits the rotational movement of the second hinge member 11 relative to the first hinge member 10 and so controls or limits the maximum angle that the door 2 can open in the swing open mode of operation.

The second hinge member 11 is selectively securable to the first hinge member 10 by means of a latching mechanism comprising an arm 16 extending from the second hinge member 11, an actuator 20 fastened to the first hinge member 10 and a latching pin 22 longitudinally moveable by the actuator 20 for engagement with an aperture 16a in the arm 16. The arm 16 extends through an aperture 17 in the first hinge member 10 and corresponding aperture 1h in the body structure 1b of the motor vehicle 1.

The third hinge member 12 has a pair of spaced apart bosses 12k each defining an aperture (not shown) through which a respective hinge pin 14 extends. As shown in FIG. 4b, the boss 12k includes an upstanding projection 12j that is engaged in a recess 11r formed in the boss 11k of the second hinge member 11. The engagement of the projection 12j with the recess 11r constitutes a swing rotation stop means that limits the rotational movement of the third hinge member 12 relative to the second hinge member 11 and is provided to allow the door 2 to rotate a small limited amount relative to the first hinge member 10 so as to release the door 2 from conventional swing open door seals (not shown) that are used to seal the door 2 to the body structure 2t of the motor vehicle 1. That is to say, the limited rotational movement of the third hinge member 12 relative to the second hinge member 11 facilitates limited movement of the door away from the surrounding body structure prior to full opening of the door.

It will be appreciated that if a conventional swing open door sealing arrangement is used then it may be required to move the door 2 away from the door seal and from the adjacent side of the body of the motor vehicle 1 before any scissor movement of the door 2 commences. That is to say, the hinge mechanism 30 for at least one of the two modes of door opening should also facilitate limited movement of the door away from the surrounding body structure about an axis of rotation that is different to the axis of rotation used to subsequently open the door. So if scissor opening is to be used, the limited rotation will be about the axis used for swing opening.

If the door seals were to be designed for scissor opening, then the door would lift out of the seals when it is opened upwards. In such a case, the hinge mechanism would therefore need to provide a limited scissor opening before swing opening could commence so as to lift the door out of the seals.

The second hinge member 11 is selectively securable to the door 2 by means of a latching mechanism comprising an arm 18 extending from the second hinge member 11, an actuator 25 fastened to the fourth hinge member 13 and a latching pin 26 longitudinally moveable by the actuator 25 for engagement with a recess 18r near a free end of the arm 18. The arm 18 extends through an aperture 19 in the fourth hinge member 13.

The fourth hinge member 13 is secured to the structural part 2t of the door 2 and includes a stub shaft 13b for rotatably connecting the fourth hinge member 13 to the third hinge member 12. The third hinge member 12 has a bearing support plate 12b connected to upper and lower bosses 12k via respective upper and lower arms 12a. A plain bearing 12p is in the case of this example supported by the bearing plate 12b for co-operation with the stub shaft 13b. The stub shaft 13b is engaged with the bearing 12p and retained in place by a circlip (not shown).

The engagement of the stub shaft 13b with the bearing 12p permits rotational movement of the door 2 relative to the first hinge member 10 and hence the structural part 1t of the motor vehicle 1 about the transverse axis y-y thereby facilitating scissor opening and closing of the door 2.

Operation of the hinge mechanism 30 is as follows.

Swing Opening

Conventional swing opening of the door 2 is facilitated by using the actuator 25 to latch the second hinge member 11 to the fourth member 13 by engaging the latching pin 26 with the recess 18r and by using the actuator 20 to retract the latching pin 22 from the aperture 16a in the arm 16. In this configuration, the second and third hinge members 11 and 12 are free to rotate about the substantially vertical axis z-z and because of the interconnection of the third hinge member 12 with the fourth hinge member 13 the door 2 is free to rotate in the direction of the arrow M on FIG. 3 from the closed position shown towards a swung open position. Sagging or drooping of the door 2 is prevented by the engagement of a projection 13s on a boss part of the stub shaft 13b with a stop 12s projecting out from the bearing support plate 12b of the third hinge member 12.

It will be appreciated that because the hinge mechanism 30 is located in the case of this example near a front end of the door 2, the door 2 will open in a conventional manner but if the hinge mechanism 30 were to be located near a rear end of a door then suicide opening of the door could be facilitated.

Scissor Opening

Scissor opening of the door 2 is facilitated by using the actuator 25 to unlatch the second hinge member 11 from the fourth member 13 by disengaging the latching pin 26 from the recess 18r in the arm 18 and by using the actuator 20 to engage the latching pin 22 with the aperture 16a in the arm 16. In this configuration the fourth hinge member 13 is free to rotate about the substantially horizontal axis y-y after the third member 12 has rotated a small amount about the z-z axis to clear the door seals. The engagement of the arm 18 with the apertures 2h and 19 constitutes a scissor rotation stop means that prevents premature upward rotation of the door 2 and the combination of the projection 12j and recess 11r limits the outward movement of the door 2 because the second hinge member 11 is latched to the first hinge member 10 by the latching mechanism 20, 22.

It will be appreciated that the length of the arm 18 is chosen to ensure that the arm 18 disengages from the apertures 2h, 19 slightly before the limited rotary motion permitted by engagement of the projection 12j with the recess 11r in the boss 11k is exhausted. It will also be appreciated that for the scissor opening to occur there is a combination of limited rotation of the door 2 about the vertical axis z-z followed by significant rotation of the fourth arm 13 and the door 2 about the horizontal axis y-y to move the door to the scissor open position shown as 2s on FIG. 2.

As before, sagging or drooping of the door 2 is prevented by the engagement of the projection 13s on the stub shaft 13b with the stop 12s projecting out from the bearing support plate 12b of the third hinge member 12 so that the only rotation of the door 2 possible from the closed position about the horizontal axis y-y is in the door opening direction.

It will be appreciated that various mechanisms could be used to assist with scissor opening of the door 2 and that the hinge mechanism is not limited to any specific type of mechanism. It will be further appreciated that the mechanism shown in FIGS. 3-4b is provided by way of example and is not intended to represent a fully engineered hinge mechanism but merely a combination of components arranged to produce the desired combination of swing and scissor opening functionality. Furthermore, although the hinge mechanism 30 shown and described uses electronically controlled latching mechanisms because such mechanisms are suitable for use as part of an apparatus for assisting with the selection of the opening mode of the door, it will be appreciated that the latching mechanism could be engineered to be manually releasable using mechanical linkages and/or cable connections if full or part automation of the mode of door opening is not provided on the motor vehicle.

Some key features of the hinge mechanism 30, according to one embodiment are that it comprises four hinge members, the first member of which is fastened to part of a body structure of a motor vehicle and the fourth member of which is fastened to a structural part of a door of the motor vehicle. This arrangement has the advantage that latching means can easily be provided on the door and the body structure to provide the required latch functionality.

In addition, if assistance means are required to facilitate opening and closing of the door in the scissor mode of operation, such assistance means can easily be accommodated within the door itself, thereby obviating the need for any connection between the assistance means and the body structure. This is important because it is not a trivial matter to design a device that has to accommodate both swing opening and scissor opening of the door if the device has to be connected between the door and the body structure of the motor vehicle.

Furthermore, if assistance means are required to facilitate opening and closing of the door in the swing mode of operation such assistance means can easily be accommodated within the body structure thereby obviating the need for any connection between the assistance means and the door.

Figure 5:
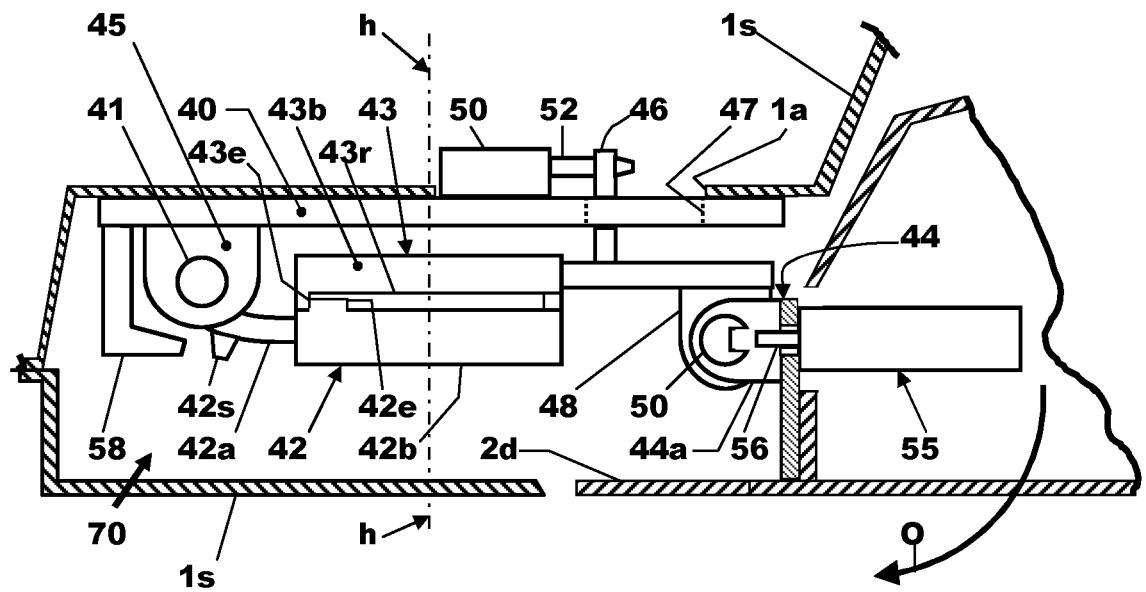
FIG. 5 is a plan view of a second embodiment of a hinge mechanism showing the hinge mechanism in a door closed position.

With reference to FIG. 5 there is shown a second embodiment of a bi-axis hinge mechanism 70 that facilitates both scissor opening and swing opening of a door such as the door 2 shown in FIGS. 1a-2 of the motor vehicle 1. The hinge mechanism 70 comprises a first hinge member 40 fastened to part of a body structure 1s of the motor vehicle 1, a second hinge member 42 pivotally connected to the first hinge member 40 for rotation about a substantially vertical first pivot axis, a third hinge member 43 pivotally connected to the second hinge member 42 so as to be rotatable about a substantially horizontal pivot axis h-h that is offset relative to the first pivot axis and a fourth hinge member 44 fastened to a structural part 2d of the door 2 and rotationally connected to the third hinge member 43 for rotation about a substantially vertical second pivot axis that is offset relative to the first pivot axis and is substantially vertically arranged when the door 2 is in the closed position.

The substantially vertical first pivot axis for the first and second hinge members 40 and 42 is defined by an elongate hinge pin 41 which is supported by a pair of spaced apart lugs 45 extending outwardly from the first hinge member 40. The substantially vertical first and second pivot axes of the hinge mechanism 70 are arranged in the case of this example substantially parallel to the vertical axis X-X of the motor vehicle 1. The substantially horizontal pivot axis h-h of the hinge mechanism 70 is arranged in the case of this example substantially parallel to the transverse horizontal axis Y-Y of the motor vehicle 1.

The second hinge member 42 has a boss (not shown) defining an aperture (not shown) through which the hinge pin 41 extends. The boss is connected to a bearing part 42b of the second hinge member 42 by an arm 42a. The arm 42a has a stop 42s formed on it for co-operation with an abutment 58 connected to the first hinge member 40. The stop 42s and the abutment 58 form in combination a swing rotation limiter to allow a limited opening of the door 2 about the first pivot axis so as to release or free the door from any door seals and provide clearance from the adjacent side of the motor vehicle when operating the hinge mechanism 70 in the scissor opening mode. That is to say, stop 42*s* and the abutment 58 that provide the limited rotational movement of the second hinge member 42 relative to the first hinge member 41 facilitate limited movement of the door away from the surrounding body structure prior to full opening of the door 2.

The third hinge member 43 includes a bearing part 43*b* that co-operates with the bearing part 42*b* of the second hinge member 42 to provide a rotational connection therebetween. As discussed previously with respect to FIG. 3 stop means (not shown on FIG. 5) are provided to prevent drooping of the door 1 when it is opened. That is to say, only rotation of the third hinge member 43 relative to the second hinge member 42 from the door closed position in a scissor opening direction is possible.

The third hinge member 43 is selectively securable to the first hinge member 40 by means of a first latching mechanism comprising an arm 46 extending from the third hinge member 43, an actuator 51 fastened to the first hinge member 41 and a latching pin 52 longitudinally moveable by the actuator 51 for engagement with an aperture (not shown) in the arm 46. The arm 46 extends through an aperture 47 in the first hinge member 40 and corresponding aperture 1*a* in the body structure 1*s* of the motor vehicle 1.

The third hinge member 43 has a pair of spaced apart lugs 48 each defining an aperture (not shown) with which a respective hinge pin 50 is engaged and is secured in the respective apertures so as to prevent rotational movement of the hinge pin 50 relative to the lugs 48. The hinge pin 50 has an elongate key-way or recess formed therein forming part of a second latching means for preventing rotational movement of the door 2 about the vertical pivot axis defined by the hinge pin 50.

The fourth hinge member 44 is pivotally connected to the third hinge member 43 by means of a pair of outwardly extending arms 44*a* each of which is rotatably engaged with the hinge pin 50 by means of a respective aperture formed therein.

A second latching mechanism prevents when engaged relative rotation between the third and fourth arms 43 and 44 and comprises an actuator 55 fastened to the fourth hinge member 44 and a latching pin 56 longitudinally moveable by the actuator 55 for engagement with the recess formed in the hinge pin 50. When the latching pin 56 is engaged with the recess in the hinge pin 50, relative rotation between the third and fourth members 43 and 44 is prevented.

In FIG. 5 the latching pin 56 is shown disengaged from the recess in the hinge pin 50 and so the fourth arm 44 and hence the door 2 is free to rotate about the vertical axis defined by the hinge pin 50 to facilitate swing opening of the door 2 as indicated by the arrow 'O.'

In order to prevent sagging or drooping of the door 2 is prevented by a stop 42*e* projecting out from the second hinge member 42 that is engaged in an elongate recess 43*r* in the third hinge member 43. The recess 43*r* has an end wall 43*e* against which the stop 42*e* reacts to prevent rotation in a door sagging direction.

Operation of the hinge mechanism 70 is as follows.

Swing Opening

Conventional swing opening of the door 2 is facilitated as shown in FIG. 5 by using the actuator 51 to latch the third hinge member 43 to the first hinge member 40 by engaging the latching pin 52 with the aperture in the arm 46 and by using the actuator 55 to retract the latching pin 56 from the recess in the hinge pin 50. In this configuration the fourth hinge member 44 is free to rotate about the vertical axis defined by the hinge pin 50 relative to the third hinge member 43 while the first, second and third hinge members are latched together by the engagement of the latching pin 52 with the aperture in the arm 46.

The fourth hinge member 44 that is attached to the door 2 is free to rotate in the direction of the arrow 'O' on FIG. 5 from the closed position shown towards an open position. Sagging or drooping of the door 2 is prevented as previously described by the engagement of the stop 42*e* with the end wall 43*e*.

It will be appreciated that because the hinge mechanism 70 is located in the case of this example near a front end of the door 2 and so the door 2 will open in a conventional manner, but that if the hinge mechanism were to be mounted near to a rear end of a door then suicide opening of the door could be provided.

Scissor Opening

Scissor opening of the door 2 is facilitated by the hinge mechanism 70 by using the actuator 55 to latch the fourth hinge member 44 to the third hinge member 43 by engaging the latching pin 56 with the recess in the hinge pin 50 and by using the actuator 51 to dis-engage the latching pin 52 from the aperture in the arm 46. In this configuration the second hinge member 42 is free to rotate about the substantially vertical second pivot axis defined by the hinge pin 41 until the stop 42*s* abuts against the abutment 58. It will be appreciated that rotation of the third hinge member 43 about the substantially horizontal axis is prevented until a free end of the arm 46 clears the aperture 47 in the first hinge member 40 which is arranged to occur just prior to contact between the stop 42*s* and the travel abutment 58. This limited rotation of the second hinge member 42 about the substantially vertical second pivot axis is provided to ensure that the door 2 will have cleared any surrounding door seal before any upward rotation of the door 2 commences. After the door 2 has rotated the required small amount to clear the door seal, the door 2 can be moved upwardly by a user from this position to effect scissor opening with the third hinge member rotating relative to the second hinge member 42 about the substantially horizontal axis h-h.

It will be appreciated that for the scissor opening to occur there is a combination of limited rotation of the door 2 about the substantially vertical second pivot axis followed by significant rotation of the door 2 about the substantially horizontal axis h-h to move the door to the scissor open position shown as 2*s* on FIG. 2. During scissor opening of the door 2 relative rotation between the fourth hinge member 44 and the third member 43 is prevented by the engagement of the latching pin 56 with the recess in the hinge pin 50.

It will be appreciated that various mechanisms could be used to assist with scissor opening of the door 2 and that the invention is not limited to any specific type of mechanism. It will be further appreciated that the hinge mechanism shown in FIG. 5 is provided by way of example and is not intended to represent a fully engineered hinge mechanism but merely a combination of components arranged to produce the desired combination of swing and scissor opening functionality.

The key features of the hinge mechanism 70, according to one embodiment are that it comprises four hinge members, the first member of which is fastened to part of a body structure of a motor vehicle and the fourth member of which is fastened to a structural part of a door of the motor vehicle. This arrangement has the advantage that latching means can easily be provided on the door and the body structure to provide the required latch functionality.

It will further be appreciated that in addition to the bi-axis hinge mechanisms 30 and 70 shown in FIGS. 3-5, the door 2 will normally be provided with a locking means to secure the door 2 when the vehicle 1 is left unattended and a stay mechanism or door check mechanism to provide various intermediate positions between open and closed.

As before, although the hinge mechanism 70 shown and described uses electronically controlled latching mechanisms because such mechanisms are suitable for use as part of an apparatus for assisting with the selection of the opening mode of the door, it will be appreciated that the latching mechanism could be engineered to be manually releasable using mechanical linkages and/or cable connections if full or part automation of the mode of door opening is not provided on the motor vehicle.

Figure 6:
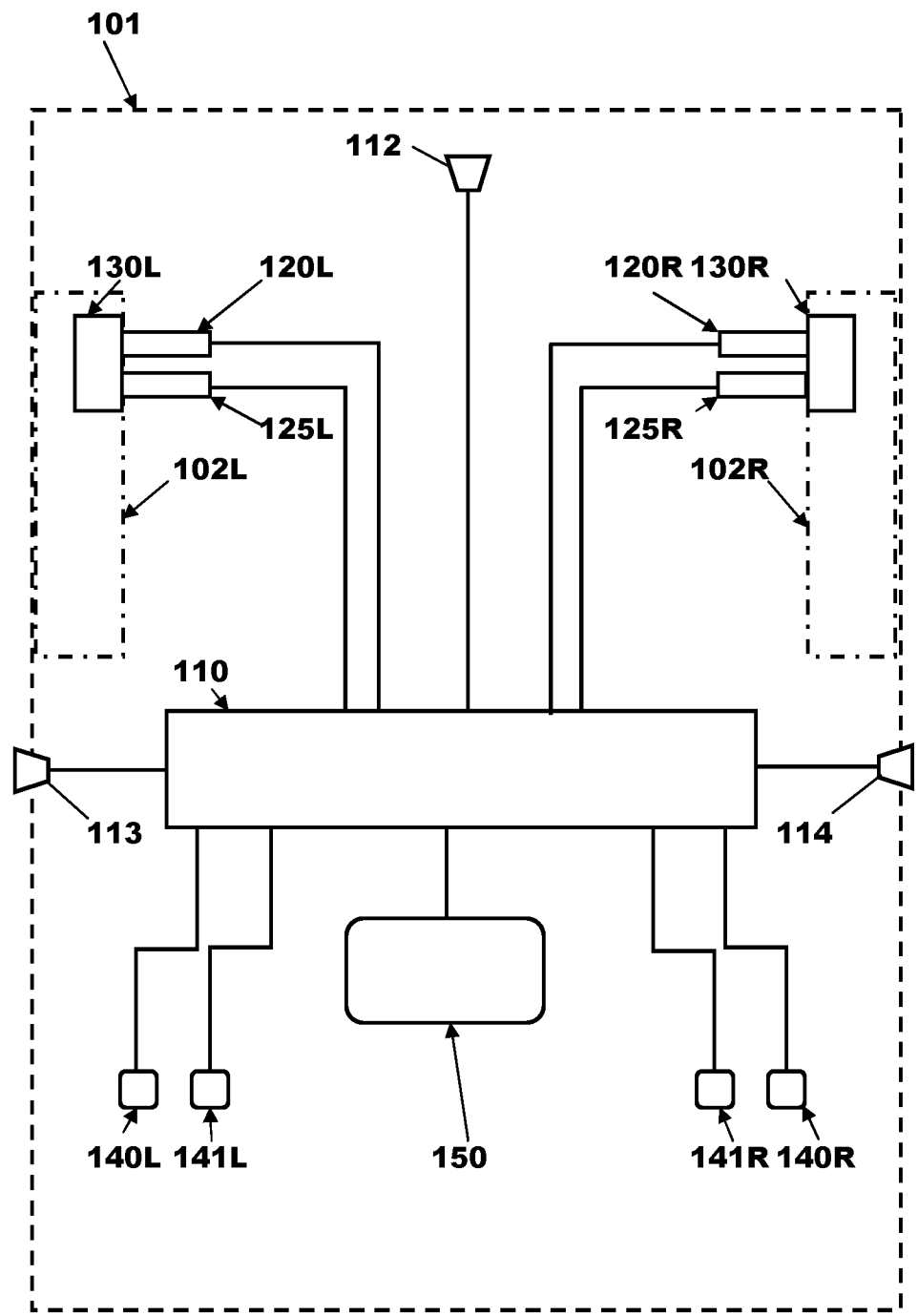
FIG. 6 is a schematic diagram of a motor vehicle apparatus to assist with the selection of an opening mode of a door of the motor vehicle, according to a first embodiment.

With particular reference to FIG. 6 there is shown a motor vehicle 101 having a first embodiment of an apparatus to assist with the selection of an opening mode of a door 102L, 102R of the motor vehicle 101. The motor vehicle 101 has a number of road wheels (not shown), a source of motive power (not shown) a body structure, left and right hand side doors 102L and 102R that are hingedly connected in the case of this example at front ends thereof to the structure of the motor vehicle 101 by respective bi-axis hinge mechanisms 130L, 130R. The multi-axis hinge mechanisms 130L, 130R facilitate both swing opening of the doors 102L, 102R and scissor opening of the doors 102L, 102R such as the hinge mechanisms 30, 70 shown in FIGS. 3-5.

The apparatus for assisting the selection of door opening mode comprises computational means in the form of an electronic controller 110, a sensing apparatus in the form of a height sensor 112 and left and right hand side sensors 113, 114, occupant input means in the form of human machine interfaces (HMIs) 140L, 140R, 141L and 141R and occupant feedback means in the form of a display 150.

The height sensor 112 can be of any suitable type and is provided to evaluate whether there is sufficient clearance above a roof of the motor vehicle 101 to permit scissor opening of the doors 102L, 102R. It will be appreciated that more than one sensor could be used to produce this evaluation and that the sensor or sensors could be located at any suitable location on the motor vehicle 101.

The left hand side sensor 113 is provided to evaluate whether there is sufficient clearance to the left of the motor vehicle 101 to permit the left hand side door 102L to be opened sufficiently to enable egress from the motor vehicle 101 without damaging the left hand side door 102L. Similarly, the right hand side sensor 114 is provided to evaluate whether there is sufficient clearance to the right of the motor vehicle 101 to permit the right hand side door 102R to be opened sufficiently to enable egress from the motor vehicle 101 without damaging the right hand side door 102L. That is to say, the sensors 113, 114 are used to see if there is enough room to open the side doors 102L, 102R using the swing open mode of door opening.

It will be appreciated that sensors providing such information are often already provided on a modern motor vehicle to assist with parking of the motor vehicle or to automatically park the motor vehicle and that such sensors could be used to provide the information required for enabling the operation of the hinge mechanism.

In the case of this example, the HMIs 140L, 141L are in the form of push switches used to provide feedback to the electronic controller 110 of the desire by the left hand side occupant that they wish to open the left hand side door 102L. The switch 140L providing an indication that the left hand side occupant intends to use the swing open mode of opening and the switch 141L being used to indicate that the left hand side occupant intends to use the scissor opening mode of operation. Similarly, in the case of this example, the HMIs 140R, 141R are in the form of push switches used to provide feedback to the electronic controller 110 of the desire by the right hand side occupant that they wish to open the right hand side door 102L. The switch 140R providing an indication that the right hand side occupant intends to use the swing open mode of opening and the switch 141R is used to indicate that the right hand side occupant intends to use the scissor opening mode of operation for the door 102R.

The hinge mechanism 130L for the left hand side door 102L includes first and second latching devices 120L, 125L and the hinge mechanism 130R for the right hand side door 102R includes first and second latching devices 120R, 125R. The latching devices 120L, 120R are used to latch part of the hinge mechanisms 130L, 130R so as to prevent scissor opening of the respective door 102L, 102R. The latching mechanisms formed by the devices 120L, 120R could for example, be arranged as per the actuator 25 and latching pin 26 of FIG. 3 or the actuator 51 and latching pin 52 of FIG. 5.

The latching devices 125L, 125R are used to latch part of the hinge mechanisms 130L, 130R so as to prevent swing opening of the respective door 102L, 102R. The latch mechanisms 125L, 125R could, for example, be arranged as per the actuator 20 and latching pin 22 of FIG. 3 or the actuator 55 and latching pin 56 of FIG. 5.

Table 1 below provide one example of the states of the latching devices 120L, 125L and 120R, 125R if the latching arrangements shown in FIGS. 3 and 5 are used.

TABLE 1

| MODE | 120L/120R | | 125L/125R | |
|---|---|---|---|---|
| Swing Open | Pin 26 | Latched | Pin 22 | Unlatched |
| | Pin 52 | Latched | Pin 56 | Unlatched |
| Scissor Open | Pin 26 | Unlatched | Pin 22 | Latched |
| | Pin 52 | Unlatched | Pin 56 | Latched |

Therefore, to achieve either swing opening or scissor opening a specific combination of actuation of the latching devices 120L, 125L; 120R, 125R is required in this embodiment.

Operation of the apparatus with respect to the left hand side door 102L is as follows. If the left hand side occupant desires to exit the vehicle 101 using a swing mode of operation they press the switch 140L which provides a signal indicative of this desire to the electronic controller 110.

The electronic controller 110 checks using the sensors 112 and 113 the current situation regarding space around the vehicle 101. In response to the indication from the user of the motor vehicle 101 that swing door opening is required, the electronic controller 110 is arranged to use the information provided from the sensing apparatus 112, 113 to select a preferred mode of door opening.

Several options below are then provided to the occupant:

option (a) If there is sufficient space to the left of the vehicle 101 to allow the door 102L to be opened fully, then either no feedback is provided to the occupant or the occupant is given a positive feedback via the display 150 such as a green signal and/or alphanumeric message such as "OK";

option (b) If there is sufficient space to permit the door 102L to be swung open sufficiently to comfortably exit the vehicle but fully opening the door 102L would cause it to contact an adjacent vehicle or obstruction, then the occupant is given a cautionary feedback via the display 150 such as an orange signal and/or alphanumeric message such as "Caution";

option (c) If there is insufficient space to permit the door 102L to be swung open sufficiently to comfortably exit the vehicle and any attempt to exit is likely to cause the door 102L to contact an adjacent vehicle or obstruction, then the occupant is given a warning feedback via the display 150 such as a red signal and/or alphanumeric message such as "Stop." This may be supplemented in some cases by an audible warning. It could also be complemented by a safety override selectable during system preferences setup that would stop the door when it has swung open to the point required for scissor opening.

In the case of options (a) and (b), the electronic controller 110 is arranged to control the latching devices 120L, 125L to allow swing opening of the door 102L.

In the case of option (c), the electronic controller 110 can be configured to either allow the occupant to proceed with swing opening of the door 102L or, if the sensor 112 indicates that there is sufficient headroom to permit scissor opening of the door 102L, the controller 110 is arranged to bar swing opening but facilitate scissor opening and provide a feedback via the display 150 to the occupant such as an alphanumeric message such as "Swing Disabled use Scissor." This may be supplemented in some cases by an audible warning to let the occupant know that their chosen mode of door opening has not been possible. In a case where it is decided that swing opening of the door 102L is not possible, the electronic controller 110 can be arranged to control the latching devices 120L, 125L to allow scissor opening of the door 102L.

Similarly, if the left hand side occupant desires to exit the vehicle 101 using a scissor mode of operation they press the switch 141L which provides a signal indicative of this desire to the electronic controller 110. The electronic controller 110 checks using the sensors 112 and 113 the current situation regarding space around the vehicle 101. In response to the indication from the user of the motor vehicle 101 that scissor door opening is required, the electronic controller 110 is arranged to use the information provided from the sensing apparatus 112, 113 to select a preferred mode of door opening.

Several options below are then provided to the occupant:

option (a) If there is sufficient space above the vehicle 101 to allow the door 102L to be scissor opened then either no feedback is provided to the occupant or the occupant is given a positive feedback via the display 150 such as a green signal and/or alphanumeric message such as "OK" and scissor opening is facilitated by the electronic controller 110 controlling the latching devices 120L, 125L to allow scissor opening of the door 102L;

option (b) If there is insufficient space to permit scissor opening of the door 102L because to do so would cause it to contact an overhead obstruction, then the occupant is given a warning feedback via the display 150 such as an orange signal and/or alphanumeric message such as "Scissor Opening Not Possible" and, provided sufficient space is present to the side of the vehicle 101 to permit swing opening, then swing opening could be facilitated by the electronic controller 110 controlling the latching devices 120L, 125L to allow swing opening of the door 102L and a feedback to the occupant can be provided via the display such as "Use Swing Opening";

option (c) If there is insufficient space to permit the door 102L to be scissor opened and insufficient space for swing opening and any attempt to exit is likely to cause the door 102L to contact an adjacent or overhead obstruction, then the occupant is given a warning feedback via the display 150 such as a red signal and/or alphanumeric message such as "Door Opening Not Possible" and the electronic controller 110 can be arranged to control the latching devices 120L, 125L to inhibit swing and scissor opening of the door 102L. This may be supplemented by an audible warning. In such a case the vehicle 101 would need to be moved to a more suitable parking location.

Therefore the apparatus assists the occupant to decide which mode of operation is preferred and will select the mode chosen by the occupant provided such a mode of opening of the door 102L is possible. It will be appreciated that the switches 140R and 141R can be used by the right hand side occupant to request opening of the right hand side door 102R in a similar manner to that previously described with respect to the left hand side door 102L with the same effect.

Figure 7:
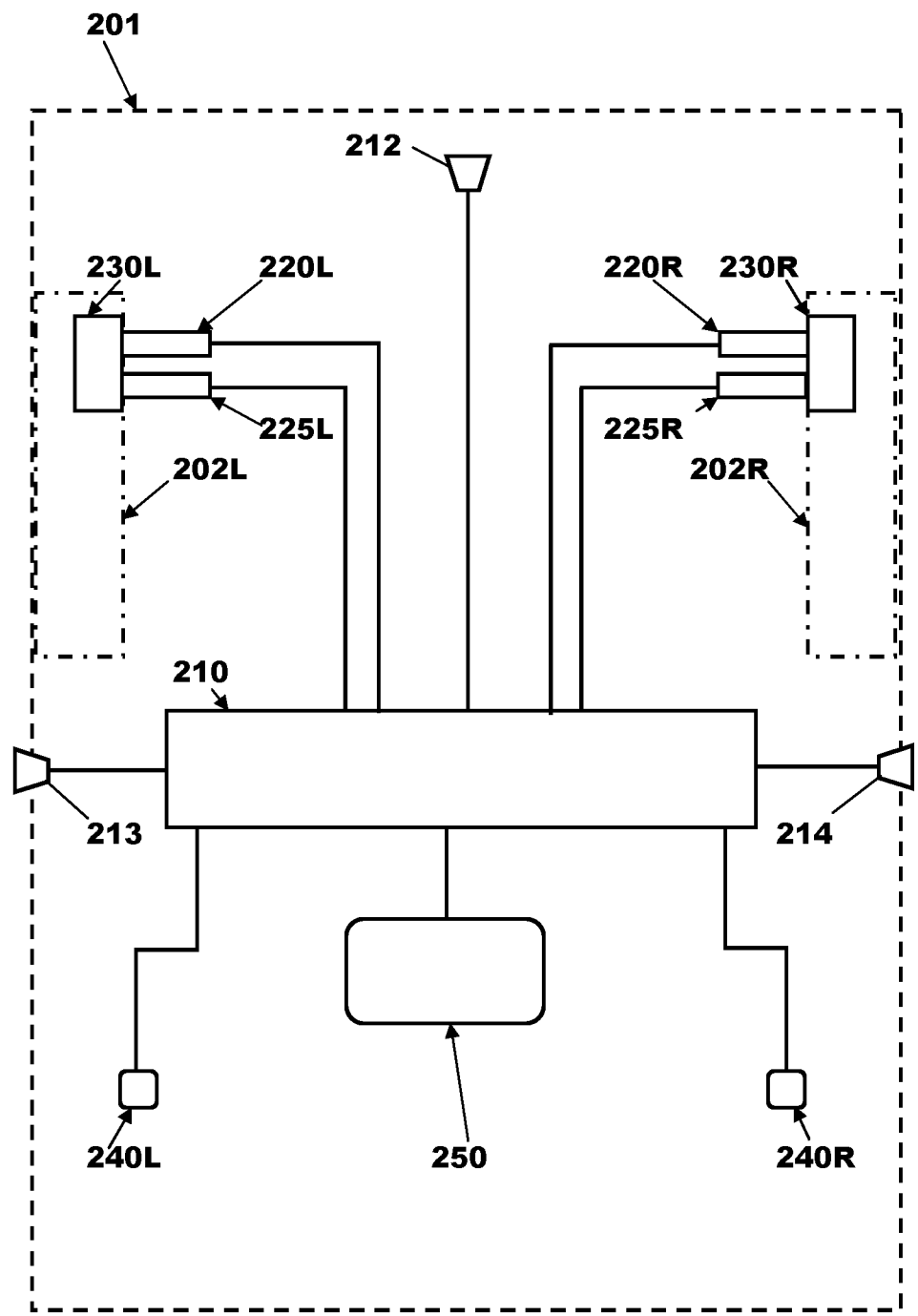
FIG. 7 is a schematic diagram of a motor vehicle showing an apparatus to assist with the selection of an opening mode of a door of the motor vehicle, according to a second embodiment.

With particular reference to FIG. 7 there is shown a motor vehicle 201 having a second embodiment of an apparatus to assist with the selection of an opening mode of a door 202L, 202R of the motor vehicle 201. The motor vehicle 201 is similar in construction to the motor vehicle 101 having a number of road wheels (not shown), a source of motive power (not shown) a body structure including left and right hand side doors 202L and 202R that are hingedly connected at front ends thereof to a support structure of the motor vehicle 101 by respective bi-axis hinge mechanisms 230L, 230R. The bi-axis hinge mechanisms 230L, 230R facilitate both swing opening of the doors 202L, 202R and scissor opening of the doors 202L, 202R and can be constructed as per the hinge mechanisms 30, 70 shown in FIGS. 3-5.

The apparatus for assisting the selection of door opening mode comprises computational means in the form of an electronic controller 210, a sensing apparatus in the form of a height sensor 212 and left and right hand side sensors 213, 214, occupant input means in the form of human machine interfaces (HMIs) 240L, 240R, electronically controllable door latching means 220L, 220R; 225L, 225R and occupant feedback means in the form of a display 250.

The height sensor 212 can be of any suitable type and is provided to evaluate whether there is sufficient clearance above a roof of the motor vehicle 101 to permit scissor opening of the doors 202L, 202R. It will be appreciated that more than one sensor could be used to produce this evaluation and that the sensor or sensors could be located at any suitable location on the motor vehicle 101.

The left hand side sensor 213 is provided to evaluate whether there is sufficient clearance to the left of the motor vehicle 101 to permit the left hand side door 202L to be opened sufficiently to enable egress from the motor vehicle 201 without damaging the left hand side door 202L. Similarly, the right hand side sensor 214 is provided to evaluate whether there is sufficient clearance to the right of the motor vehicle 201 to permit the right hand side door 202R to be opened sufficiently to enable egress from the motor vehicle 201 without damaging the right hand side door 202L.

That is to say, the sensors 213, 214 are used to see if there is enough room to open the side doors 202L, 202R using the swing open mode of hinge operation. It will be appreciated that sensors providing such information are often already provided on a modern motor vehicle to assist with parking of the motor vehicle or to automatically park the motor vehicle and that such sensors could be used to provide the information required by the electronic controller 210 to enable operation of the hinge mechanism.

In the case of this example, the HMIs 240L, 240R are in the form of push switches used to provide feedback to the electronic controller 210 of the desire by the left and right hand side occupants, respectively, that they wish to open the left and right hand side doors 202L and 202R respectively.

The hinge mechanism 230L for the left hand side door 202L includes first and second latching devices 220L, 225L and the hinge mechanism 230R for the right hand side door 202R includes first and second latching devices 220R, 225R. The latching devices 220L, 220R are used to latch part of the hinge mechanisms 230L, 230R so as to prevent scissor opening of the respective door 202L, 202R. The latching mechanisms formed by the devices 220L, 220R could for example be arranged as per the actuator 25 and latching pin 26 of FIG. 3 or the actuator 51 and latching pin 52 of FIG. 5. The latching devices 225L, 225R are used to latch part of the hinge mechanisms 230L, 230R so as to prevent swing opening of the respective door 202L, 202R. The latch mechanisms 225L, 225R could for example be arranged as per the actuator 20 and latching pin 22 of FIG. 3 or the actuator 55 and latching pin 56 of FIG. 5.

Table 1 above provides examples of the states of the latching devices 120L, 125L and 120R, 125R having the same functionality as the latching devices 220L, 225L and 220R, 225R when the latching arrangements shown in FIGS. 3 and 5 are used. From Table 1 it can be seen that to achieve either swing opening or scissor opening a specific combination of actuation of the latching devices 220L, 225L; 220R, 225R is required.

Operation of the apparatus is as follows as described with respect to the left hand side door 202L. If the left hand side occupant desires to exit the vehicle 201, they press the switch 240L which provides a signal indicative of this desire to the electronic controller 210. Unlike the first embodiment shown in FIG. 6, in this second embodiment, the selection of the door opening mode is performed automatically without user input apart from an indication from the user that door opening is requested.

The electronic controller 210 checks using the sensors 212 and 213 the current situation regarding space around the vehicle 101 and based upon this assessment decides which is the most appropriate mode of door opening. If possible, swing opening may normally be chosen because this requires the least effort on the part of the occupant and places the least strain on the components of the hinge mechanism.

Several options below are possible:

option (a) If there is sufficient space to the left of the vehicle 201 to allow the door 202L to be swung open fully then the electronic controller 210 is arranged to control the latching devices 220L, 225L to allow swing opening of the door 202L and feedback is provided to the occupant via the display 250 such as a green signal and/or alphanumeric message such as "Swing Opening Selected";

option (b) If there is sufficient space to permit the door 202L to be swung open sufficiently to comfortably exit the vehicle but fully, opening the door 202L would cause it to contact an adjacent vehicle or obstruction, then the electronic controller 210 is arranged to control the latching devices 220L, 225L to allow swing opening of the door 202L and the occupant is given a cautionary feedback via the display 250 such as an orange signal and/or alphanumeric message such as "Swing Opening Selected Proceed with Caution";

option (c) If there is insufficient space to permit the door 202L to be swung open sufficiently to exit the vehicle and any attempt to exit is likely to cause the door 202L to contact an adjacent vehicle or obstruction, then the electronic controller 210 checks using the sensor 112 that scissor opening is possible and, if it is, the electronic controller 210 is arranged to control the latching devices 220L, 225L to allow scissor opening of the door 202L and the occupant is given a feedback via the display 250 such as a blue signal and/or alphanumeric message such as "Scissor Opening Selected";

option (d) If there is insufficient space to permit the door 202L to be scissor opened and insufficient space for swing opening and any attempt to exit is likely to cause the door 202L to contact an adjacent or overhead obstruction, then the occupant is given a warning feedback via the display 250 such as a red signal and/or alphanumeric message such as "Door Opening Not Possible" and the electronic controller 210 is arranged to control the latching devices 220L, 225L to inhibit swing and scissor opening of the door 202L. This may be supplemented by an audible warning. In such a case, the vehicle 101 would preferably need to be moved to a more suitable parking location. As stated below, a driver override is also provided to prevent an occupant getting trapped in the vehicle. The override could also be used if the obstruction is not significant such as, for example, tall grass or flowers or there is a system fault.

Therefore, the apparatus assists the occupant to decide which mode of operation is possible and automatically selects the most suitable mode of door opening based upon the feedback received from the overhead and side sensors 112 and 113.

It will be appreciated that the switches 240R can be used by the right hand side occupant to request opening of the right hand side door 202R in a similar manner to that previously described with respect to the left hand side door 202L and with the same effect. The only significant difference is that the sensors used by the electronic controller 210 are the overhead sensor 112 and the right hand side sensor 214.

It will also be appreciated that instead of using a default swing opening methodology the electronic controller 210 could be arranged to assess the relative merits of swing opening and scissor opening based upon the information received regarding the current location of the motor vehicle 201 and its surroundings and select a preferred mode of opening based upon this assessment.

It will further be appreciated that if both of the occupants request door opening at more or less the same time then the electronic controller 210 could be arranged to enable scissor opening for the left door 202L and swing opening for the right hand side door 202R or vice-versa depending upon the specifics of the location in which the vehicle 201 is parked.

It will also be appreciated that the HMI used by a driver of the vehicle 201 could be enabled to open both doors 202L, 202R and, in such a case, the electronic controller 210 could be arranged to use swing opening for one of the doors 202L, 202R and swing opening for the other 202R, 202L, swing opening for both doors 202L, 202R or scissor opening for both doors 202L, 202R depending upon the surroundings of the vehicle 201.

Figure 8:
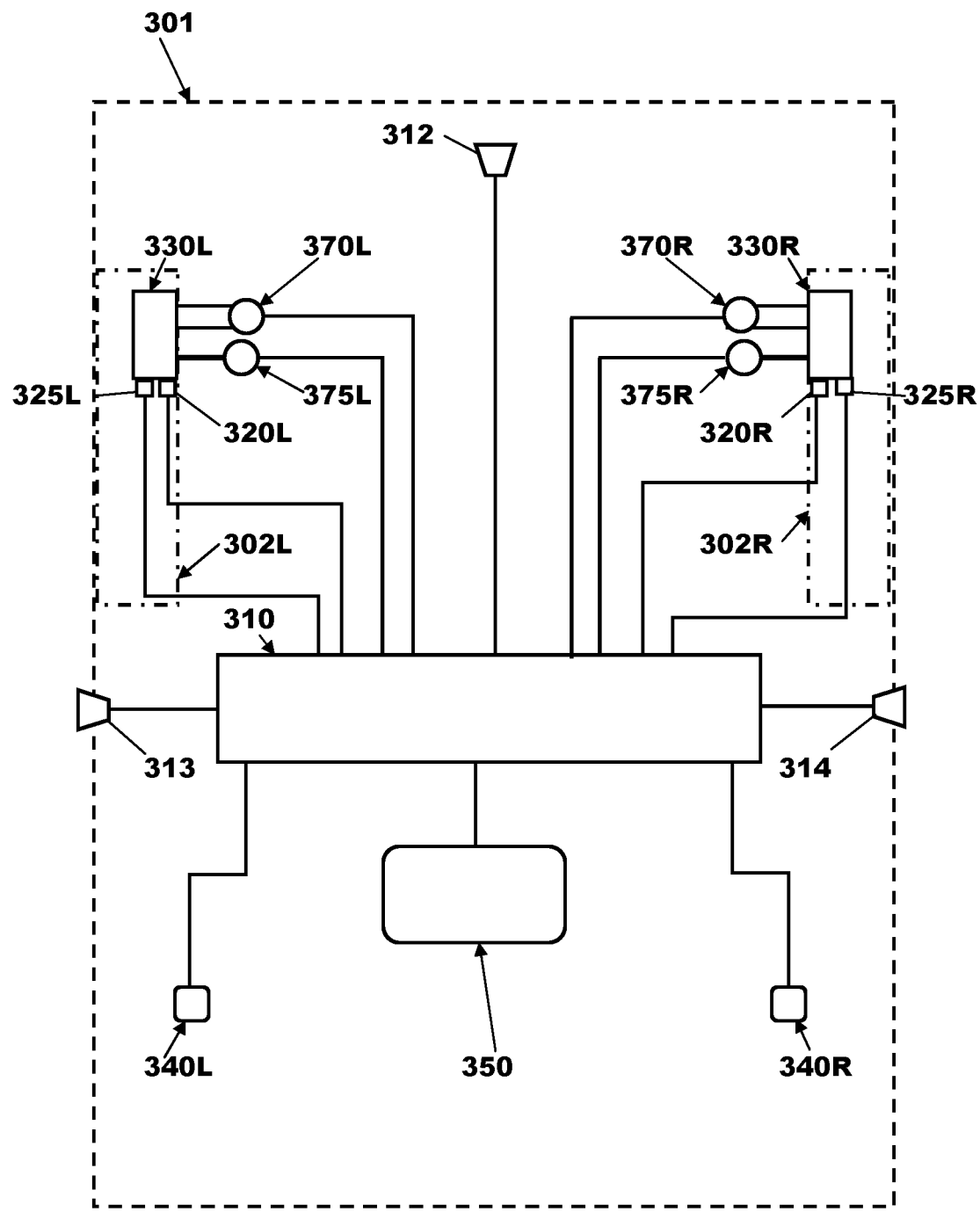
FIG. 8 is a schematic diagram of a motor vehicle showing an apparatus to assist with the selection of an opening mode of a door of the motor vehicle, according to a third embodiment.

With respect to FIG. 8 there is shown a motor vehicle 301 having a third embodiment of an apparatus to assist with the selection of an opening mode of a door 302L, 302R of the motor vehicle 301. The motor vehicle 301 is similar in construction to the motor vehicle 201 having left and right hand side doors 302L, 302R, front mounted bi-axis hinge mechanisms 330L, 330R that facilitate both swing opening of the doors 302L, 302R and scissor opening of the doors 302L, 302R such as the hinge mechanisms 30, 70 shown in FIGS. 3-5.

The apparatus for assisting the selection of door opening mode comprises computational means in the form of an electronic controller 310, sensor means in the form of a height sensor 312 and left and right hand side sensors 313, 314, occupant input means in the form of human machine interfaces (HMIs) 340L, 340R and occupant feedback means in the form of a display 350. In addition, door latching mechanisms 320L, 320R; 325L, 325R and door actuations mechanisms 370L, 370R, 375L, 375R are provided as part of the apparatus.

As before, the height sensor 312 can be of any suitable type and is provided to evaluate whether there is sufficient clearance above a roof of the motor vehicle 301 to permit scissor opening of the doors 302L, 302R. It will be appreciated that more than one sensor could be used to produce this evaluation and that the sensor or sensors could be located at any suitable location on the motor vehicle 301.

The left hand side sensor 313 is provided to evaluate whether there is sufficient clearance to the left of the motor vehicle 301 to permit the left hand side door 302L to be opened sufficiently to enable egress from the motor vehicle 301 without damaging the left hand side door 302L. Similarly, the right hand side sensor 314 is provided to evaluate whether there is sufficient clearance to the right of the motor vehicle 301 to permit the right hand side door 302R to be swung open sufficiently to enable comfortable egress from the motor vehicle 301 without damaging the right hand side door 302L. That is to say, the sensors 313, 314 are used to see if there is enough room to open the side doors 302L, 302R using the swing open mode of hinge operation.

It will be appreciated that sensors providing such information are often already provided on a modern motor vehicle to assist with parking of the motor vehicle or to automatically park the motor vehicle and that such sensors could be used to provide the information required by the electronic controller 310 of the apparatus to enable operation of the hinge mechanism.

In the case of this example, the HMIs 340L, 340R are in the form of touch screen push switches used to provide feedback to the electronic controller 310 of the desire by the left and right hand side occupants, respectively, that they wish to open the left and right hand side doors 302L and 302R, respectively.

The hinge mechanism 330L for the left hand side door 302L includes first and second latching devices 320L, 325L and first and second actuation mechanisms 370L, 375. The hinge mechanism 330R for the right hand side door 302R includes first and second latching devices 320R, 325R and first and second actuation mechanisms 370R, 375R.

The actuation devices 370L, 370R are used to produce scissor movement of the respective door 302L, 302R in response to a control signal from the electronic controller 310. The actuation devices 375L, 375R are used to produce swing movement of the respective door 302L, 302R in response to a control signal from the electronic controller 310.

The latching mechanisms in the form of the devices 320L, 325L; 320R, 325R operate in a similar manner to the latching devices 220L, 225L; 220R, 225R previously described with reference to FIG. 7.

Figure 9:
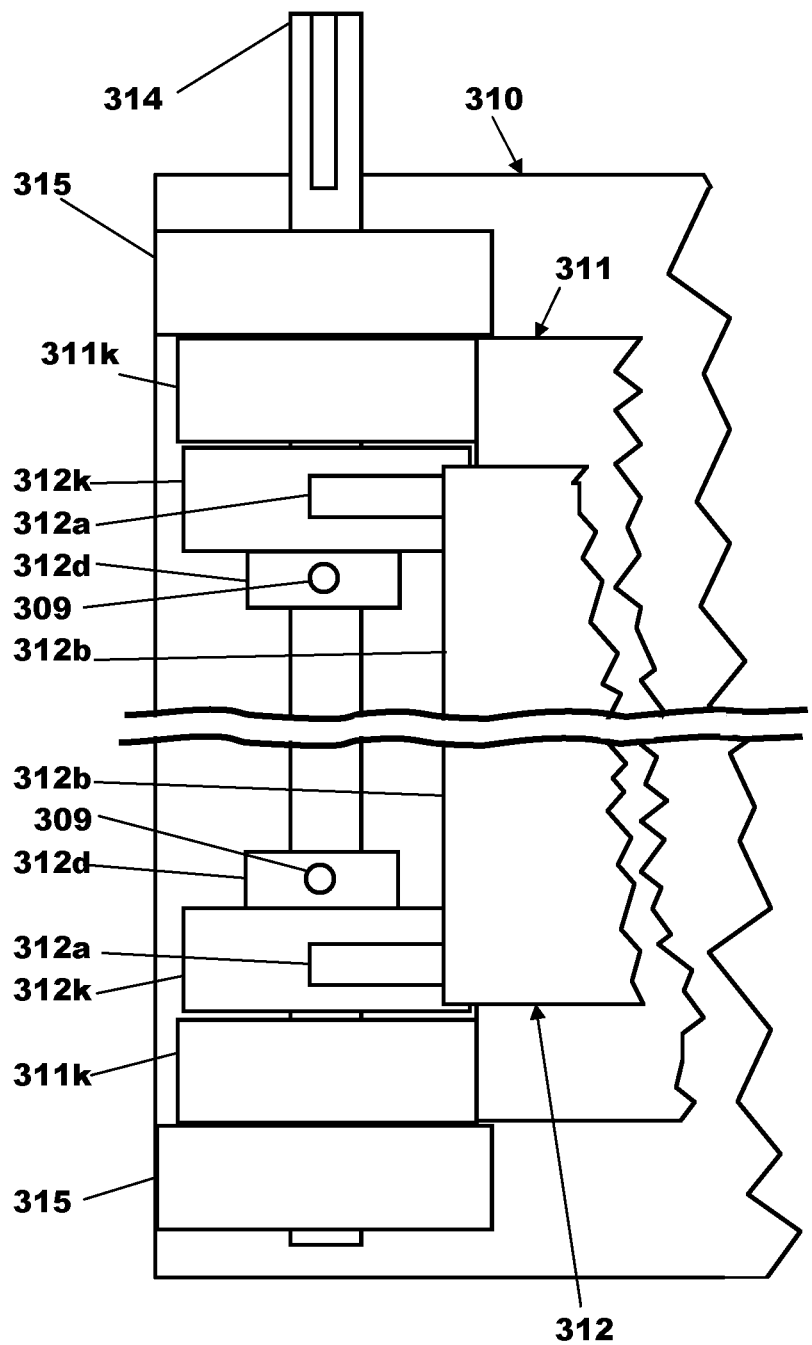
FIG. 9 is a side view on an enlarged scale of part of the hinge mechanism shown in FIGS. 3 and 4 showing how the hinge mechanism can be adapted for powered swing opening of the door.
Figure 10A:
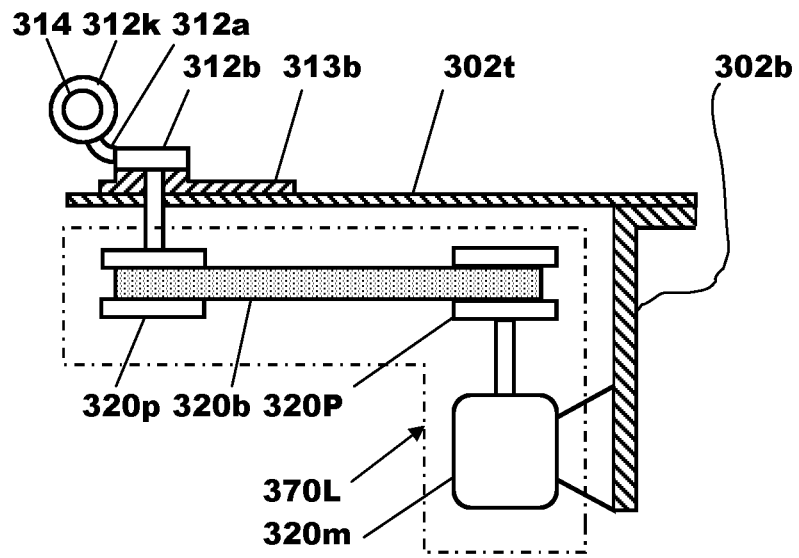
FIG. 10a is a schematic plan view similar to that of FIG. 3 showing how the hinge mechanism of FIG. 3 can be adapted for powered scissor opening of the door.
Figure 10B:
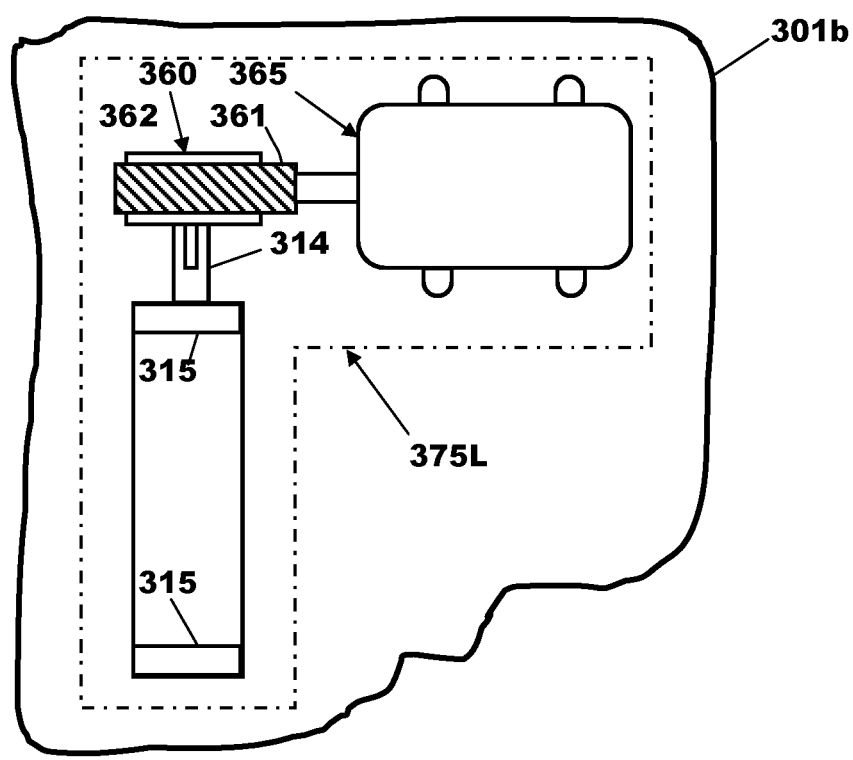
FIG. 10b is a schematic side view showing how the hinge mechanism of FIG. 9 is adapted for powered swing opening of the door.

FIG. 10a shows in a diagrammatic form one example of an actuation mechanism 370L and FIGS. 9 and 10b show one example of an actuation mechanism 375L. It will be appreciated that similar mechanisms could be used for the actuation mechanisms 370R, 375R. The actuation mechanisms shown in FIGS. 9, 10a and 10b show how such mechanisms can be applied to a bi-axis hinge mechanism of the type shown in FIG. 3. It will also be appreciated that the invention is not limited to the use of the actuation mechanisms shown in FIGS. 9, 10a and 10b.

Referring firstly to FIG. 10a, the scissor motion actuation mechanism 370L comprises an electric motor 320m driving a drive pulley 320P drivingly connected to a driven pulley 320p by a toothed belt 320b. The driven pulley 320p is fastened to one end of a stub shaft 312b having an arm 312a extending therefrom to a boss 312k supported by a pivot shaft 314 forming a vertical pivot axis for a door having a structure 302t. The stub shaft 312b is rotatably supported by a bearing forming part of a fourth hinge member 313b fastened to a door structure 302t. The motor 320m is also fastened to the door structure 302t via a bracket 302b.

When the motor 320m drives the drive pulley 320P, rotation of the driven pulley 320p is not possible because it is held fast by the connection formed by the arm 312a from the stub axle 312b to the boss 312k and the engagement of the boss 312k with the pivot shaft 314. Therefore, instead of the motor 320m causing rotation of the driven pulley 320p, it causes the door to which the motor 320m is fastened via the bracket 302b to be moved in a scissor opening direction or a scissor closing direction depending upon the direction of rotation of the output from the motor 320m.

It will be appreciated that control of the motor 320m is carried out by the electronic controller 310 and that simultaneously the electronic controller 310 will control the latching devices 320L, 325L to allow for the required motion. It will also be appreciated that other drive arrangements could be used between the motor 320m and the stub shaft 312b. It will be further appreciated that the motor could be replaced by a ram type actuator and linkage or other suitable actuation means.

With reference to FIGS. 9 and 10b, the pivot shaft 314 on FIGS. 9 and 10b is formed by a single shaft extending between and rotatably supported by a pair of lugs 315 extending outwardly from the first hinge member 310. The second hinge member 311 is journaled on the pivot shaft 314 by means of a pair of spaced apart bosses 311k. The third hinge member 312 has the stub axle 312b attached via a pair of arms 312a to a complementary pair of spaced apart bosses 312k. Each of the bosses 312k is fastened for rotation with the pivot shaft 314 via a drive boss portion 312d having an aperture formed therein through which a drive pin 309 extends for press-fit engagement with an aperture (not shown) in the pivot shaft 314.

As shown in FIG. 10b, the pivot shaft 314 has a drive means fastened thereto via a key-drive in the form of a worm drive 360 having a worm 361 driven by a motor 365 and a worm gear 362 fastened to the end of the pivot shaft 314 via keyways formed in the worm gear 362 and the pivot shaft 314 and a complementary drive key. The motor 365 is fastened to part of a body structure 301t of the motor vehicle 301.

Rotation of the worm 361 by the motor 365 causes the worm 361 to rotate the worm gear 362 with which it is engaged and hence the pivot shaft 314. Because the pivot shaft 314 is fastened to the third hinge member 312 by the drive boss portions 312d and drive pins 309 any rotation of the worm 361 will result in rotation of the third hinge member 312 about a vertical axis defined by the pivot shaft 314 and hence swing opening or closing of a door connected to the third hinge member via the pivotal connection between the third hinge member 312 and a fourth hinge member (not shown in FIGS. 9 and 10b) arranged as per the fourth hinge member 13 shown in FIG. 3 and the fact that the fourth hinge member is fastened to the door.

It will be appreciated that other drive arrangements could be used between the motor 365 and the door. It will be further appreciated that the motor could be replaced by a ram type actuator and linkage or other suitable actuation means. It will further be appreciated that latching means as shown in FIG. 3 are used in the case of this example but in other embodiments the actuation mechanisms 370L, 375L themselves could be used to hold the parts of the hinge mechanism not be used for the chosen door opening or closing in desired positions.

Operation of the apparatus with respect to the left hand side door 302L is as follows. If the left hand side occupant desires to exit the vehicle 301 they press the switch 340L which provides a signal indicative of this desire to the electronic controller 310.

The electronic controller 310 checks using the information from the sensors 312 and 313 the current situation regarding space around the vehicle 301 and based upon this assessment decides which is the preferred or most appropriate mode of door opening. If possible swing opening is chosen because this requires the least effort on the part of the actuation mechanisms 370L, 375L used to open and close the door 302L.

Several options below are possible:

option (a) If the electronic controller 310 based upon the information/inputs it receives from the sensors 312, 313 determines that there is sufficient space to the left of the vehicle 301 to allow the door 302L to be swung open fully, then the electronic controller 310 is arranged to control the actuation mechanism 375L to swing open the door 302L to a maximum open position while using the latching mechanism 325L to hold the components of the hinge mechanism not required for swing opening together. That is to say, with reference to FIG. 3 the second, third and fourth hinge members 11, 12 and 14 are latched together while the second hinge member 11 is free to rotate about a vertical axis relative to the first hinge member 10. Feedback can be provided to the occupant via the display 350 to indicate that such action is being taken such as a green signal and/or alphanumeric message such as "Swing Opening Commencing";

option (b) If there is sufficient space to permit the door 302L to be swung open sufficiently to allow an occupant to exit the vehicle but fully opening the door 302L would cause it to contact an adjacent vehicle or obstruction, then the electronic controller 310 is arranged to control the actuation mechanism 375L to allow swing opening of the door 302L to a position adjudged to be safe and that will not cause contact with an adjacent obstacle. The occupant is given a cautionary feedback via the display 350 such as an orange signal and/or alphanumeric message such as "Restricted Swing Opening Commencing";

option (c) If there is insufficient space to permit the door 302L to be swung open sufficiently to allow an occupant to exit the vehicle 301, the electronic controller 310 proceeds to check using the sensor 312 whether scissor opening is possible and, if it is, the electronic controller 310 is arranged to control the actuation mechanism 370L to scissor open the door 302L while using the latching mechanism 320L to hold components not required for scissor opening in desired positions and releasing latching mechanism 325L so as to allow limited rotation to clear any door seal. This process will normally comprise using the actuation mechanism 375L to swing open the door a very small amount such as 15 to 20 degrees to free the door 302L from any door seals before using the actuation mechanism 370L to rotate the door 302L to effect scissor opening. The occupant can be given a feedback via the display 350 such as a blue signal and/or alphanumeric message such as "Scissor Opening Commencing";

option (d) If there is insufficient space to permit the door 302L to be scissor opened and insufficient space for swing opening, then the occupant is given a warning feedback via the display 350 such as a red signal and/or alphanumeric message such as "Door Opening Not Possible" and the electronic controller 310 is arranged to control the latching devices and the actuation mechanisms 320L, 325L and 370L, 375L to inhibit swing and scissor opening of the door 302L. This action may be supplemented by an audible warning. In such a case, the vehicle 301 would need to be moved to a more suitable parking location before an occupant can exit.

Therefore, the apparatus assists the occupant in the case of this third embodiment by automatically deciding which mode of operation is possible, selecting the most suitable mode of door opening based upon the feedback received from the overhead and side sensors 312 and 313 and then energizing the actuation mechanisms 370L, 375L in the required manner to effect the selected mode of door opening.

It will be appreciated that the switch 340R can be used by the right hand side occupant to request opening of the right hand side door 302R in a similar manner to that previously described with respect to the left hand side door 302L and with the same effect. The only significant difference is that the sensors used by the electronic controller 310 are the overhead sensor 312 and the right hand side sensor 314.

It will be appreciated that instead of using a default swing opening methodology the electronic controller 310 could be arranged to assess the relative merits of swing opening and scissor opening based upon the current location of the motor vehicle 301 and its surroundings and use this assessment as the basis for deciding which mode of operation to use.

It will also be appreciated that if both occupants request to exit the vehicle 301 at the same time or a similar time, then the electronic controller 310 could enable scissor opening for the left door 302L and swing opening for the right hand side door 302R or vice-versa depending upon the specifics of the location in which the vehicle 301 is parked.

It will also be appreciated that the HMI used by a driver of the vehicle 301 could be enabled to open both doors 302L, 302R and, in such a case, the electronic controller 310 could be arranged to use powered swing opening for one of the doors 302L, 302R and powered scissor opening for the other door 302R, 302L, powered swing opening for both doors 302L, 302R or powered scissor opening for both doors 302L, 302R depending upon the surroundings of the vehicle 301.

It will be appreciated that in the case of the three embodiments shown in FIGS. 6 to 8, means accessible from outside the respective vehicle 101, 201, 301 may also be provided to enable a user of the vehicle to enter it. It will be appreciated that in all cases there could be an override mechanism provided to allow the occupants to escape the motor vehicle if there is an apparatus failure.

To effect swing opening of a door it is normally required to rotate the door more than 60 degrees about a vertical pivot axis from its closed position and to effect scissor opening of a door it normally required to rotate the door more than 70 degrees about a horizontal pivot axis from its closed position.

It will be appreciated by those skilled in the art that although the invention has been described by way of example with reference to one or more embodiments it is not limited to the disclosed embodiments and that alternative embodiments could be constructed without departing from the scope of the invention as defined by the appended claims.

It will be understood that any described processes or steps within described processes may be combined with other disclosed processes or steps to form structures within the scope of the present invention. The exemplary structures and processes disclosed herein are for illustrative purposes and are not to be construed as limiting.

What is claimed is:

1. A motor vehicle having an apparatus for assisting with the selection of an opening mode of a door of the motor vehicle hingedly connected to a body structure of the motor vehicle by a hinge mechanism providing both swing and scissor opening modes of door opening, wherein the apparatus comprises:
   an electronic controller;
   at least one human machine interface connected to the electronic controller to provide an indication from a user of the motor vehicle that opening of the door is required; and
   a sensing apparatus to provide information to the electronic controller indicative of whether there are any obstructions to the side of the motor vehicle that would interfere with swing opening of the door and whether there are any overhead obstructions that would interfere with scissor opening of the door, wherein, in response to an indication from the user of the motor vehicle that door opening is required, the electronic controller is arranged to use the information provided from the sensing apparatus to select a preferred mode of door opening; and
   wherein the hinge mechanism comprises a plurality of connected hinge members facilitating door opening in the swing mode where the door is rotatable about a first axis between closed and fully swung open positions and the scissor mode where the door is rotatable about a second axis arranged substantially perpendicular to the first axis between the closed position and a scissor open position, wherein the plurality of hinge members comprises first, second, third and fourth hinge members, the first hinge member is used to attach the hinge mechanism to part of the body structure of the motor vehicle, the first hinge member and the third hinge member form a first pair of hinge members, the third and fourth hinge members form a second pair of hinge members and the fourth hinge member is used to attach the hinge mechanism to the door, and wherein the second hinge member is pivotally connected to the first hinge member for rotation about the first axis and is selectively latchable to the first hinge member and the fourth hinge member to control the opening mode of the door.

2. The vehicle as claimed in claim 1, wherein if the information from the sensing apparatus indicates that there is sufficient space for the door to be swung open sufficiently to permit egress from the vehicle then the swing open mode of door opening is selected by the electronic controller.

3. The vehicle as claimed in claim 1, wherein the apparatus further comprises one or more user feedback devices connected to the electronic controller and selecting a preferred mode of door opening comprises providing feedback to the vehicle user using the one or more feedback devices of the mode of door opening that has been selected by the electronic controller as the preferred mode of door opening.

4. The vehicle as claimed in claim 1, wherein the hinge mechanism further includes at least two latching mechanisms controlled by the electronic controller and selecting the preferred mode of door opening includes using the electronic controller to operate the latching mechanisms to facilitate the preferred mode of door opening while inhibiting the other mode of door opening.

5. The vehicle as claimed in claim 1, wherein the hinge mechanism further includes powered swing and scissor door actuation mechanisms controlled by the electronic controller and selecting the preferred mode of door opening includes using the electronic controller to operate at least one of the door actuation mechanisms to produce the preferred mode of door opening.

6. A hinge mechanism connecting a door to a body structure of a motor vehicle, comprising:
   a plurality of connected hinge members facilitating door opening in a swing mode where the door is rotatable about a first axis between closed and fully swung open positions and a scissor mode where the door is rotatable about a second axis arranged substantially perpendicular to the first axis between the closed position and a scissor open position, wherein the plurality of hinge members comprises first, second, third and fourth hinge members, the first hinge member is used to attach the hinge mechanism to part of the body structure of the motor vehicle, the first hinge member and the third hinge member form a first pair of hinge members, the third and fourth hinge members form a second pair of hinge members and the fourth hinge member is used to attach the hinge mechanism to the door, and wherein the second hinge member is pivotally connected to the first hinge member for rotation about the first axis and is selectively latchable to the first hinge member and the fourth hinge member to control the opening mode of the door.

7. The hinge mechanism as claimed in claim 6, wherein the first axis is a substantially vertically arranged axis to facilitate the swing mode of door opening and the second axis is a substantially horizontally arranged axis to facilitate the scissor mode of door opening.

8. The hinge mechanism as claimed in claim 6, wherein to facilitate the swing mode of door opening the second hinge member is not latched to the first hinge member and is latched to the fourth hinge member so as to hold the second third and fourth hinge members together and to facilitate the scissor mode of door opening the second hinge member is latched to the first hinge member and is not latched to the fourth hinge member.

9. The hinge mechanism as claimed in claim 6, wherein the hinge mechanism for at least one of the two modes of door opening also facilitates limited movement of the door away from the surrounding body structure about an axis of rotation that is different to the axis of rotation used to subsequently open the door, and wherein the hinge mechanism further comprises a swing rotation stop to provide a predefined limited rotation of the third hinge member about the first axis when the second hinge member is latched to the first hinge member but not to the fourth hinge member to provide the limited movement of the door away from the surrounding body structure prior to full scissor opening of the door.

10. The hinge mechanism as claimed in claim 8, wherein the hinge mechanism further comprises a first latching mechanism to selectively latch the second hinge member to the first hinge member and a second latching mechanism to selectively latch the second hinge member to the fourth hinge member, and wherein the first and second latching mechanisms are electronically controllable latching mechanisms.

11. The hinge mechanism as claimed in claim 9, wherein the second hinge member includes a scissor rotation stop to prevent rotation of the fourth hinge member relative to the third hinge member about the second axis before the limited rotation of the third hinge member about the first axis provided by the swing rotation stop is exhausted.

12. The hinge mechanism as claimed in claim 6, wherein the hinge mechanism comprises first, second, third and fourth hinge members wherein the first hinge member is the hinge member used to attach the hinge mechanism to the body structure, the fourth hinge member is the hinge member used to attach the hinge mechanism to the door, the third and fourth hinge member form the first pair of hinge members, the second and third hinge members form the second pair of hinge members and the second hinge member is pivotally connected to the first hinge member for limited rotation about a third substantially vertical axis spaced away from the first and second axes.

13. The hinge mechanism as claimed in claim 12, wherein the fourth hinge member rotates relative to the third hinge member about the first pivot axis to facilitate the swing mode of door opening and the third hinge member rotates relative to the second hinge member about the second axis to facilitate the scissor mode of door opening.

14. The hinge mechanism as claimed in claim 12, wherein the hinge mechanism includes a first latching mechanism to selectively latch the first and third hinge members together and a second latching mechanism to selectively latch the third and fourth hinge members together, and wherein the first and second latching mechanisms are electronically controllable latching mechanisms.

15. The hinge mechanism as claimed in claim 14, wherein the hinge mechanism for at least one of the two modes of door opening also facilitates limited movement of the door away from the surrounding body structure about an axis of rotation that is different to the axis of rotation used to subsequently open the door, and wherein the hinge mechanism includes a swing rotation stop to allow a limited rotation of the second hinge member relative to the first hinge member about the third axis when the first latching mechanism is unlatched to provide the limited movement of the door away from the surrounding body structure prior to scissor opening of the door.

16. The hinge mechanism as claimed in claim 14, wherein to permit swing opening of the door, the second latching mechanism is unlatched and the first latching mechanism is latched so as to hold the first and third members together, and wherein to permit scissor opening of the door, the first latching mechanism is unlatched and the second latching mechanism is latched.

17. The hinge mechanism as claimed in claim 15, wherein the third hinge member includes a scissor rotation stop to prevent rotation of the third hinge member relative to the second hinge member about the second axis before the limited rotation of the second hinge member about the third axis provided by the swing rotation stop is exhausted.

18. An apparatus for selecting an opening mode of a door connected to a vehicle by a hinge mechanism providing swing and scissor opening modes, comprising:
 a human machine interface receiving a door opening request;
 a sensor sensing side obstructions that would interfere with swing opening of the door and overhead obstructions that would interfere with scissor opening of the door; and
 a controller selecting a mode of door opening based on the sensed obstructions; and
 wherein the hinge mechanism comprises a plurality of connected hinge members facilitating door opening in the swing mode where the door is rotatable about a first axis between closed and fully swung open positions and the scissor mode where the door is rotatable about a second axis arranged substantially perpendicular to the first axis between the closed position and a scissor open position, wherein the plurality of hinge members comprises first, second, third and fourth hinge members, the first hinge member is used to attach the hinge mechanism to part of the body structure of the motor vehicle, the first hinge member and the third hinge member form a first pair of hinge members, the third and fourth hinge members form a second pair of hinge members and the fourth hinge member is used to attach the hinge mechanism to the door, and wherein the second hinge member is pivotally connected to the first hinge member for rotation about the first axis and is selectively latchable to the first hinge member and the fourth hinge member to control the opening mode of the door.

* * * * *